(12) United States Patent
Marushak et al.

(10) Patent No.: US 7,124,234 B2
(45) Date of Patent: Oct. 17, 2006

(54) MANAGING TRANSMISSIONS BETWEEN DEVICES

(75) Inventors: Nathan E. Marushak, Gilbert, AZ (US); Deif N. Atallah, Chandler, MA (US)

(73) Assignee: Intel Corporation, Santa Clara, CA (US)

( * ) Notice: Subject to any disclaimer, the term of this patent is extended or adjusted under 35 U.S.C. 154(b) by 209 days.

(21) Appl. No.: 10/744,499

(22) Filed: Dec. 22, 2003

(65) Prior Publication Data

US 2005/0138261 A1 Jun. 23, 2005

(51) Int. Cl.
G06F 15/177 (2006.01)
G06F 13/36 (2006.01)
G06F 13/00 (2006.01)
H04J 3/16 (2006.01)

(52) U.S. Cl. .................. 710/316; 709/220; 710/302; 370/466

(58) Field of Classification Search .......... 710/316
See application file for complete search history.

(56) References Cited

U.S. PATENT DOCUMENTS

| 6,418,492 | B1 * | 7/2002 | Papa et al. ............ 710/302 |
| 6,574,695 | B1 * | 6/2003 | Mott et al. ............ 710/302 |
| 6,907,008 | B1 * | 6/2005 | Moskovich et al. ...... 370/241 |
| 2004/0004959 | A1 * | 1/2004 | Itakura ................ 370/352 |
| 2004/0193736 | A1 * | 9/2004 | Galloway .............. 710/1 |
| 2005/0066100 | A1 * | 3/2005 | Elliott et al. ......... 710/300 |
| 2005/0210159 | A1 * | 9/2005 | Voorhees et al. ....... 710/5 |

FOREIGN PATENT DOCUMENTS

EP 0 871 309 10/1998

OTHER PUBLICATIONS

Elliot, R. "Serial Attached SCSI Architecture", Sep. 30, 2003, pp. 1-46.
International Committee for Information Technology Standards (INCITS). T10 Technical Committee, "Information Technology—Serial Attached SCSI (SAS)", *Working Draft—American National Standard*, T10/1562-D, Revision 5, Jul. 9, 2003, pp. i-xxxii, 1-432.
International Committee for Information Technology Standards (INCITS). T11 Technical Committee, "Fibre Channel— Framing and Signaling (FC-FS)", *Working Draft—American National Standard*, T11/1331-D, Revision 1.90, Apr. 9, 2003, pp. i-xlvi, 1-18 (Ch. 1-3).
International Committee for Information Technology Standards (INCITS), T13 Technical Committee, "Information Technology—AT Attachment with Packet Interface-6 (ATA/ATAPI-6)", *Working Draft—American National Standard*. T13/1410-D, Revision 3b, Feb. 26, 2002, pp. i-viii, 1-56 (Ch. 1-6).
PCT International Search Report & Written Opinion, May 9, 2005, for International Application No. PCT/US2004/041671.

* cited by examiner

Primary Examiner—Rehana Perveen
Assistant Examiner—Brian Misiura
(74) Attorney, Agent, or Firm—David W. Victor; Konrad Raynes & Victor LLP

(57) ABSTRACT

Provided are a method, system, and program for processing a transmission from a first device to a second device. An identification transmission is received including an interface address from the first device. A determination is made as to whether the identification transmission indicates a recognized vendor identifier. An interface address of a third device is returned to the first device in response to determining that the identification transmission includes one recognized vendor identifier, wherein the third device relays transmissions between the first and second devices.

37 Claims, 8 Drawing Sheets

MANAGING TRANSMISSIONS BETWEEN DEVICES

BACKGROUND

1. Field

The embodiments relate to managing transmissions between devices

2. Description of the Related Art

An adaptor or multi-channel protocol controller enables a device coupled to the adaptor to communicate with one or more connected end devices over a connection according to a storage interconnect architecture, also known as a hardware interface, where a storage interconnect architecture defines a standard way to communicate and recognize such communications, such as Serial Attached Small Computer System Interface (SCSI) (SAS), Serial Advanced Technology Attachment (SATA), Fibre Channel, etc. Further details on the Fibre Channel architecture are described in the technology specification "Fibre Channel Framing and Signaling Interface", document no. ISO/IEC AWI 14165-25. Devices may communicate through a cable or through etched paths on a printed circuit board when the devices are embedded on the printed circuit board. These storage interconnect architectures allow a device to maintain one or more connections with end devices through a direct connection to the end device or through one or more expanders. In the SAS/SATA architecture, a SAS port is comprised of one or more SAS PHYs, where each SAS PHY interfaces a physical layer, i.e., the physical interface or connection, and a SAS link layer having multiple protocol link layer. Communications from the SAS PHYs in a port are processed by the transport layers for that port. There is one transport layer for each SAS port to interface with each type of application layer supported by the port. A "PHY" as defined in the SAS protocol is a device object that is used to interface to other devices and a physical interface. Further details on the SAS architecture for devices and expanders is described in the technology specification "Information Technology—Serial Attached SCSI (SAS)", reference no. ISO/IEC 14776-150: 200x and ANSI INCITS.***:200x PHY layer (Jul. 9, 2003), published by ANSI and details on the SATA architecture are described in the technology specification "Serial ATA: High Speed Serialized AT Attachment" Rev. 1.0A (January 2003).

An expander is a device that facilitates communication and provides for routing among multiple SAS devices, where multiple SAS devices and additional expanders connect to the ports on the expander, where each port has one or more SAS PHYs and corresponding physical interfaces. The expander also extends the distance of the connection between SAS devices. With an expander, a device connecting to a SAS PHY on the expander may be routed to another expander PHY connected to a SAS device. Further details on the SAS architecture for devices and expanders is described in the technology specification "Information Technology—Serial Attached SCSI (SAS)", reference no. ISO/IEC 14776-150:200x and ANSI INCITS.***:200x PHY layer (Jul. 9, 2003), published by ANSI, referred to herein as the "SAS Specification".

A port in an adaptor or expander contains one or more PHYs. Ports in a device are associated with PHYs based on the configuration that occurs during an identification transmission. An identification transmission are those one or more transmissions a device initiates to inform a connected device of information on the interface. A port is assigned one or more PHYs within a device for those PHYs within that device that are configured to use the same SAS address during the identification sequence and that connect to attached PHYs that also transmit the same address during the identification sequence. A wide port has multiple PHYs and a narrow port has only one PHY. A wide link comprises the set of physical links that connect the PHYs of a wide port to the corresponding PHYs in the corresponding remote wide port and a narrow link is the physical link that attaches a narrow port to a corresponding remote narrow port.

An interface is a physical or logical component that is connected to another interface on the same or a different device. The term interface may include interfaces other than PHY interfaces. A wide port comprises a port assigned multiple interfaces, where one or more interfaces may be assigned to a port. An interface address, such as the SAS address, comprises an address or identifier assigned to one or more interfaces.

The SAS specification provides two expander types, a fanout expander and an edge expander. A fanout expander may be located between edge expanders. An edge expander PHY connects to a fanout expander PHY, and each fanout expander PHY may connect to a separate edge expander, which edge expander connects to end devices. However, in the current SAS specification, there can only be one fanout expander in a domain. A domain comprises all devices that can be reached through an initiator port, where the port may connect to multiple target devices through one or more expanders or directly. Further, each edge expander device set shall not be attached to more than one fanout expander device. An edge expander device set may be attached to one other edge expander device set if that is the only other edge expander device set in the domain and there are no fanout expander devices in the domain.

For instance, a SAS initiator PHY may connect to an edge expander PHY. If that edge expander connects to another edge expander, then according to the SAS specification, the second edge expander must connect to end devices. Each expander extends the distance of a connection by eight meters. Thus, adding two expanders between an initiator and target devices extends the connection from eight meters to 24 meters. If an initiator connects to an edge expander, which connects to a fanout device, which then connects to one or more edge expander which connect to end devices, then the distance of the connection between an initiator and target has been extended from eight meters to 32 meters, where in the SAS Specification 32 meters is the maximum distance between SAS end devices.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
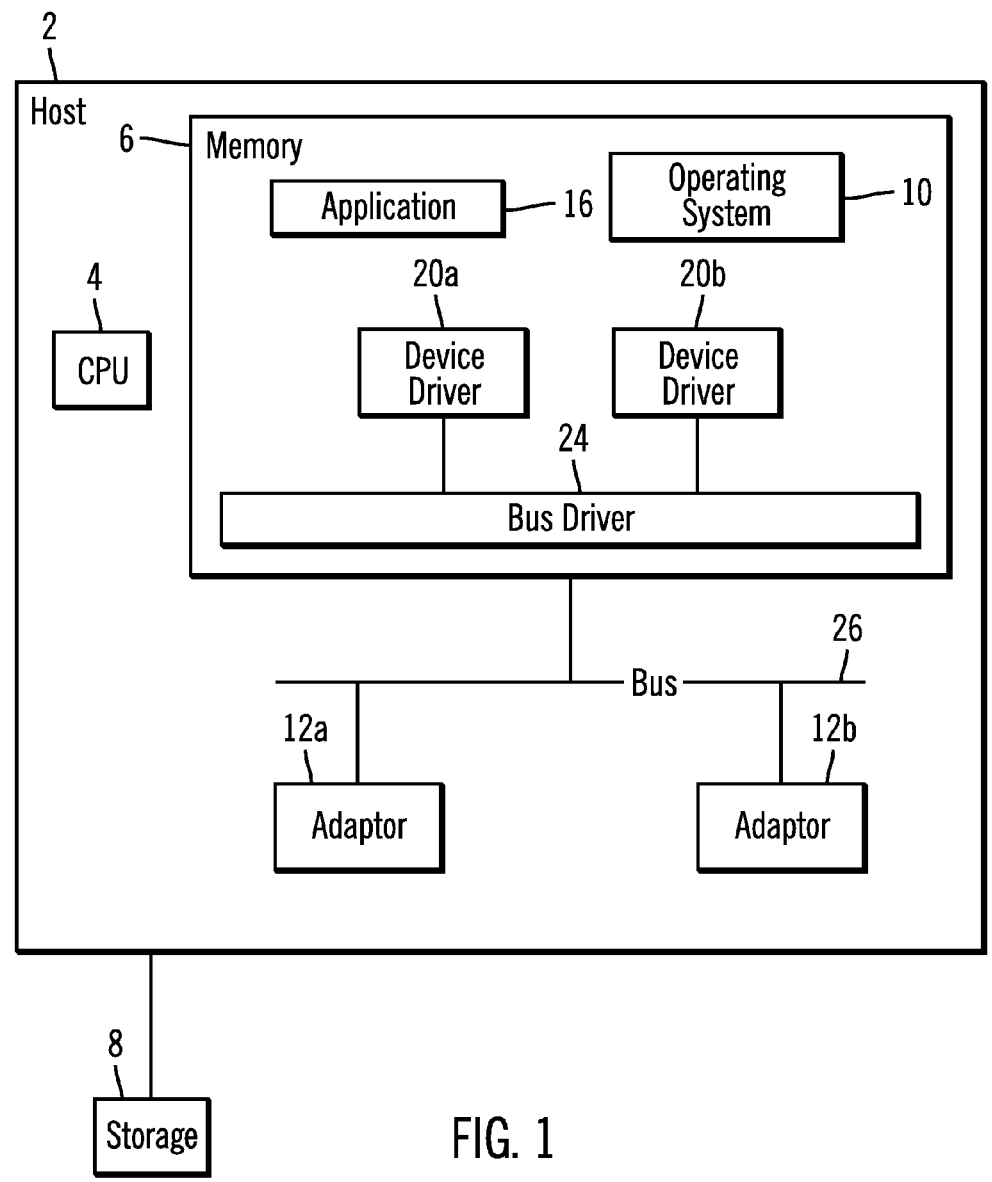
FIGS. 1 and 2 illustrate a system and adaptor architecture in accordance with embodiments.

FIG. 1 illustrates a computing environment in which embodiments may be implemented. A host system 2 includes one or more central processing units (CPU) 4 (only one is shown), a volatile memory 6, non-volatile storage 8, an operating system 10, and adaptors 12a, 12b which includes physical interfaces to connect with remote devices, comprising end devices, switches, expanders, storage devices, servers, etc. An application program 16 further executes in memory 6 and is capable of transmitting and receiving frames via one of the adaptors 12a, 12b. The host 2 may comprise any computing device known in the art, such as a mainframe, server, personal computer, workstation, laptop, handheld computer, telephony device, network appliance, virtualization device, storage controller, etc. Various CPUs 4 and operating system 10 known in the art may be used. Programs and data in memory 6 may be swapped into storage 8 as part of memory management operations.

The operating system 10 may load a device driver 20a and 20b for each storage interface supported in the adaptor 12 to enable communication with a device communicating using the same supported storage interface and also load a bus interface 24, such as a Peripheral Component Interconnect (PCI) interface, to enable communication with a bus 26. The operating system 10 may load device drivers 20a and 20b supported by the adaptors 12a, 12b upon detecting the presence of the adaptors 12a, 12b, which may occur during initialization or dynamically, such as the case with plug-and-play device initialization. In the embodiment of FIG. 1, the operating system 10 loads two device drivers 20a and 20b. For instance, the device drivers 20a and 20b may support the SAS and SATA storage interfaces, i.e., interconnect architectures. Additional or fewer device drivers may be loaded based on the number of storage interfaces the adaptors 12a and 12b supports.

Figure 2:
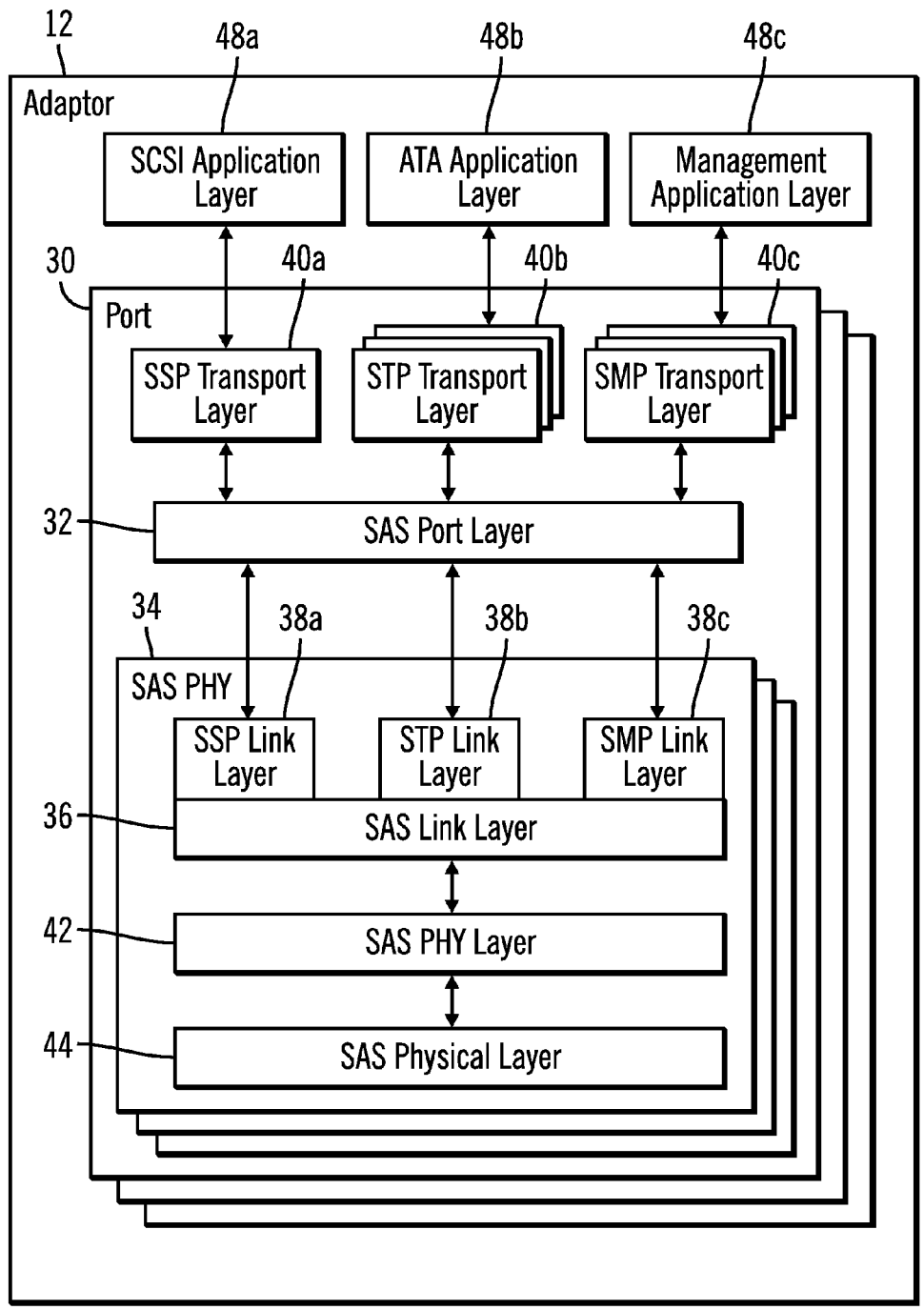

FIG. 2 illustrates an embodiment of an adaptor 12, which may comprise the adaptors 12a, 12b. FIG. 2 additionally illustrates a configuration that may be used in any SAS device, including a SAS expander, initiator, target, etc. Each SAS device includes one or more ports 30, where each port 30 contains a port layer 32 that interfaces with one or more SAS PHYs 34. Each PHY includes a link layer 36 having one or more protocol link layers. FIG. 2 shows three protocol link layers, including a Serial SCSI Protocol (SSP) link layer 38a to process SSP frames, a Serial Tunneling Protocol. (STP) layer 38b, a Serial Management Protocol (SMP) layer 38c, which in turn interface through port layer 32 with their respective transport layers, a SSP transport layer 40a, a STP transport layer 40b, and an SMP transport layer 40c.

Each PHY 34 for port 30 further includes a SAS PHY layer 42 and a physical layer 44. The physical layer 44 comprises the physical interface, including the transmitter and receiver circuitry, paths, and connectors. As shown, the physical layer 44 is coupled to the PHY layer 42, where the PHY layer 42 provides for an encoding scheme, such as 8b10b to translate bits, and a clocking mechanism, such as a phased lock loop (PLL) to convert data between a serial and parallel format. Data is received at the adaptor 12 in a serial format, and is converted by the SAS PHY layer 42 to the parallel format for transmission within the adaptor 12. The SAS PHY layer 42 further provides for error detection, bit shift and amplitude reduction, and the out-of-band (OOB) signaling to establish an operational link with another SAS PHY in another device, speed negotiation with the PHY in the external device transmitting data to adaptor 12, etc.

In the embodiments of FIG. 2, there is one protocol transport layer 40a, 40b, and 40c to interface with each type of application layer 48a, 48b, 48c in the application layer 50. The application layer 50 may be supported in the adaptor 12 or host system 2 and provides network services to the end users. For instance, the SSP transport layer 46a interfaces with a SCSI application layer 48a, the STP transport layer 46c interfaces with an Advanced Technology Attachment (ATA) application layer 48b, and the SMP transport layer 46d interfaces with a management application layer 48c. Further details on the operations of the physical layer, PHY layer, link layer, port layer, transport layer, and application layer and components implementing such layers described herein are found in the SAS Specification, which publication was cited above. Further details of the ATA technology are described in the publication "Information Technology—AT Attachment with Packet Interface—6 (ATA/ATAPI-6)", reference no. ANSI INCITS 361-2002 (September, 2002).

An adaptor 12 may further have one or more unique domain addresses, where different ports in an adaptor 12 can be organized into different domains or devices. The SAS address of a PHY may comprise the SAS address of the port to which the PHY is assigned and that port SAS address is used to identify and address the PHY to external devices. A port is uniquely identified by the SAS address assigned to that port and the SAS address of the PHYs to which the PHYs in the port connect. An interface address comprises an address assigned to an interface; where an interface may comprise a PHY, a logical interface and/or a physical interface, etc., such that an interface provides a connection to another interface which may be on a remote device.

Figure 3:
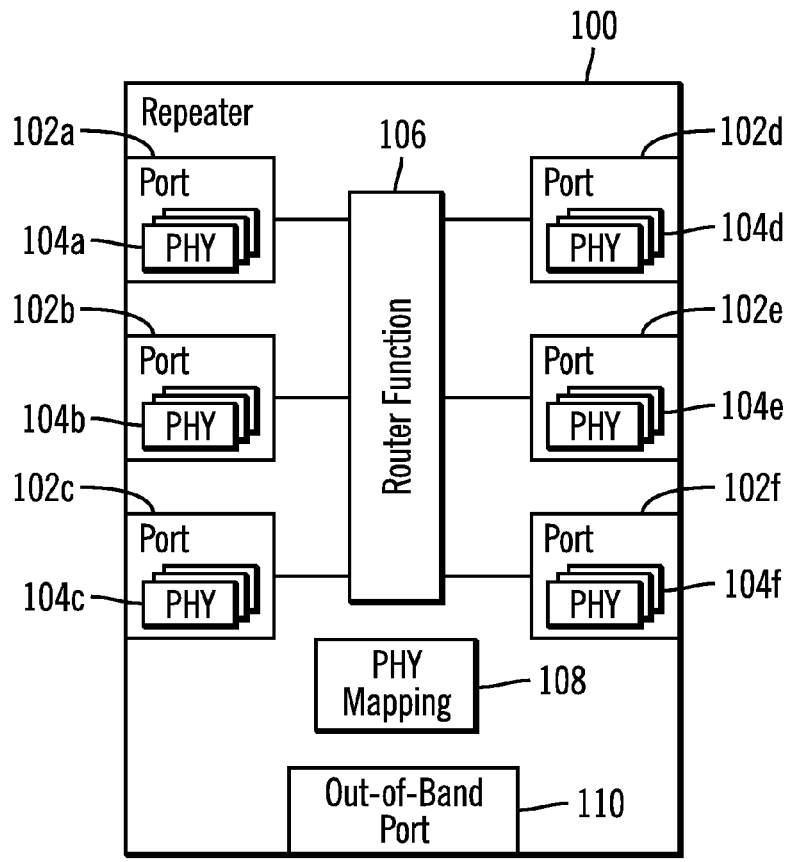
FIG. 3 and illustrate components of a repeater in accordance with embodiments.

FIG. 3 illustrates the architecture of a repeater 100, which may be placed between expanders to extend the distance of the connections between initiators and targets. The repeater 100 includes a plurality of ports 102a, 102b, 102c, each including one or more PHYs 104a, 104b, 104c that map to corresponding ports 102d, 102e, 102f, each including one or more PHYs 104d, 104e, 104f. Although a certain number of ports are shown, any number of ports may be configured in the repeater and connected devices, where each port may be assigned one or more PHYs. Each PHY 104a, 104b, 104c, 104d, 104e, 104f shown in one port refers to one or more PHYs. A router function 106 provides a mapping 108 of each PHY 104a, 104b, 104c to one of the PHYs 104d, 104e, 104f. In this way, a transmission received at PHYs 104a, 104b, 104c is transmitted to the router function 106 which then forwards the transmission to one PHY 104d, 104e, 104f associated with PHY 104a, 104b, 104c according to the PHY mapping 108.

The repeater 100 further includes an out-of-band port 110 that enables configuration of the repeater 100, such as the PHY mapping 108, speed of the PHYs, SAS address assigned to the repeater 100, and PHY electrical settings, such as an overdrive signal to enable greater transmission distances. The out-of-band interface may comprise interfaces such as I$^2$C, Ethernet, etc., which is different than the in-band storage interfaces, i.e., SAS/SATA, used on the external repeater ports 102a, 102b, 102c, 102d, 102e, 102f.

Figure 4:
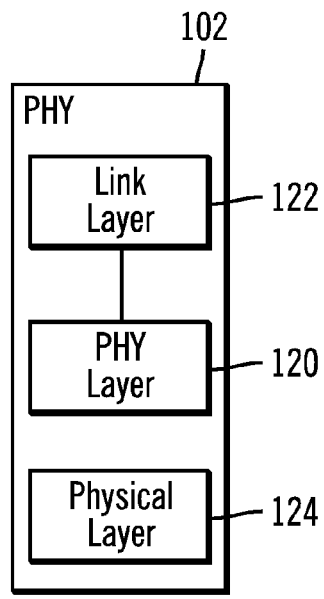

FIG. 4 illustrates further details of a repeater PHY 102 as including a PHY layer 120, a link layer 122, and a physical layer 124. The PHY layer 120 performs PHY operations such as speed negotiation, error detection, bit shift and amplitude reduction, and out-of-band (OOB) signaling to establish an operational link with another SAS PHY in another device. The link layer 122 performs link layer operation to transport transmissions to the router function 106. The physical layer 124 provides the physical connection to another device, which may comprise a transceiver coupled to cables or etched paths on a printed circuit board.

The repeater 100 may operate in two modes. In a first mode, other devices in a SAS architecture do not recognize the repeater and the repeater seamlessly forwards communications received on one PHY 104a, 104b, 104c, 104d, 104e, 104f to a corresponding PHY 104a, 104b, 104c, 104d, 104e, 104f according to the PHY mapping 108. In this first mode, during initialization, the repeater 100 does not return a SAS address for the repeater 100 to connected devices, i.e., end devices or further expanders. Instead, during initialization, the repeater 100 forwards the identify address frames of connected devices to the corresponding connected device according to the PHY mapping 108, remaining transparent and unrecognized in the network topology. Further, in this first mode, the repeater will not appear in discovery maps and will not be manageable via in-band vendor unique SMP commands.

In the second mode, the repeater 100 detects that it is connected to a device from a recognized vendor that provides specific support for the repeater. In such case, the repeater 100 during initialization will forward a unique SAS address from a pool of SAS addresses in response to an identify address frame from a connected device from a recognized vendor. The SAS address from the repeater 100 may include one or more bits indicating a vendor and one or more bits indicating that it is a repeater device type. In certain embodiments, the SAS address may be included in an identify frame having a reserved device type field that indicates that the device is a repeater. In this way, the identify frame has the repeater SAS address and a device type field indicating a repeater device type. The SAS initiator will recognize the repeater in its discovery maps and issue specific in-band SMP commands to configure and communicate with the repeater 100. Thus, in certain embodiments, in-band configuration of the repeater is only allowed if the repeater 100 returns a SAS address including an identifier of a recognized vendor to enable the connected device from the recognized vendor to configure the repeater. The recognized vendor device may use vendor specific SMP commands transmitted in-band to configure the repeater 100. Otherwise, the repeater 100 must be configured via the out-of-band port 110.

Figure 5:
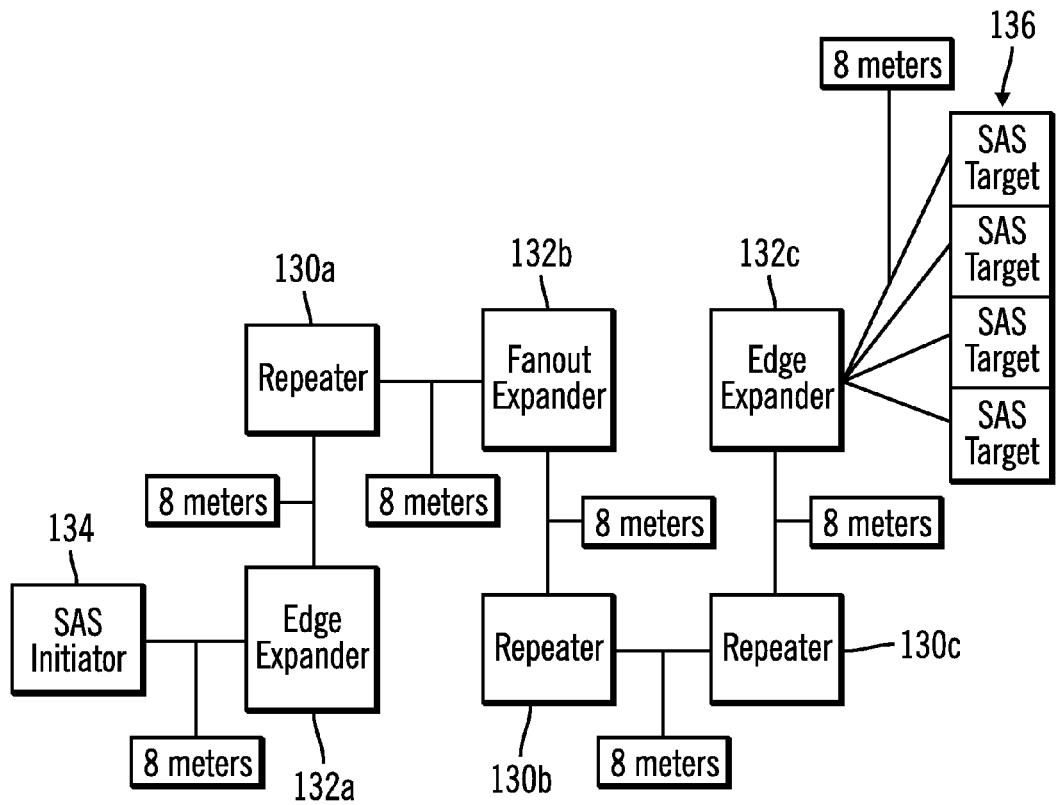
FIGS. 5 and 6 illustrate network topologies using a repeater in accordance with embodiments.
Figure 6:
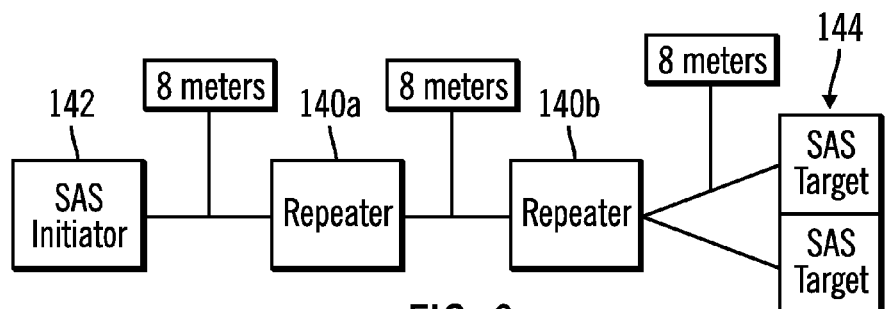

FIGS. 5 and 6 illustrate how a repeater 100 may be deployed in a SAS network topology. In FIG. 5 repeaters 130a, 130b, 130c are interspersed between expanders 132a, 132b, 132c to extend the distance between a SAS initiator 134 and SAS target devices 136. Each repeater 130a, 130b, 130c allows the distance to be extended by eight meters. Further two repeaters may be connected, e.g., 130b, 130c, to extend the distance by 16 meters as shown.

FIG. 6 illustrates how two repeaters 140a, 140b may be used to extend the distance between a SAS initiator 142 and SAS target devices 144 without the use of expanders. The repeaters 140a, 140b extend the distance between the initiator 142 and targets 144 by 16 meters.

As shown in FIGS. 5 and 6, the repeater allows extension of the connection to overcome the limit of the number of expanders that may be deployed according to the current SAS specification.

Figure 7:
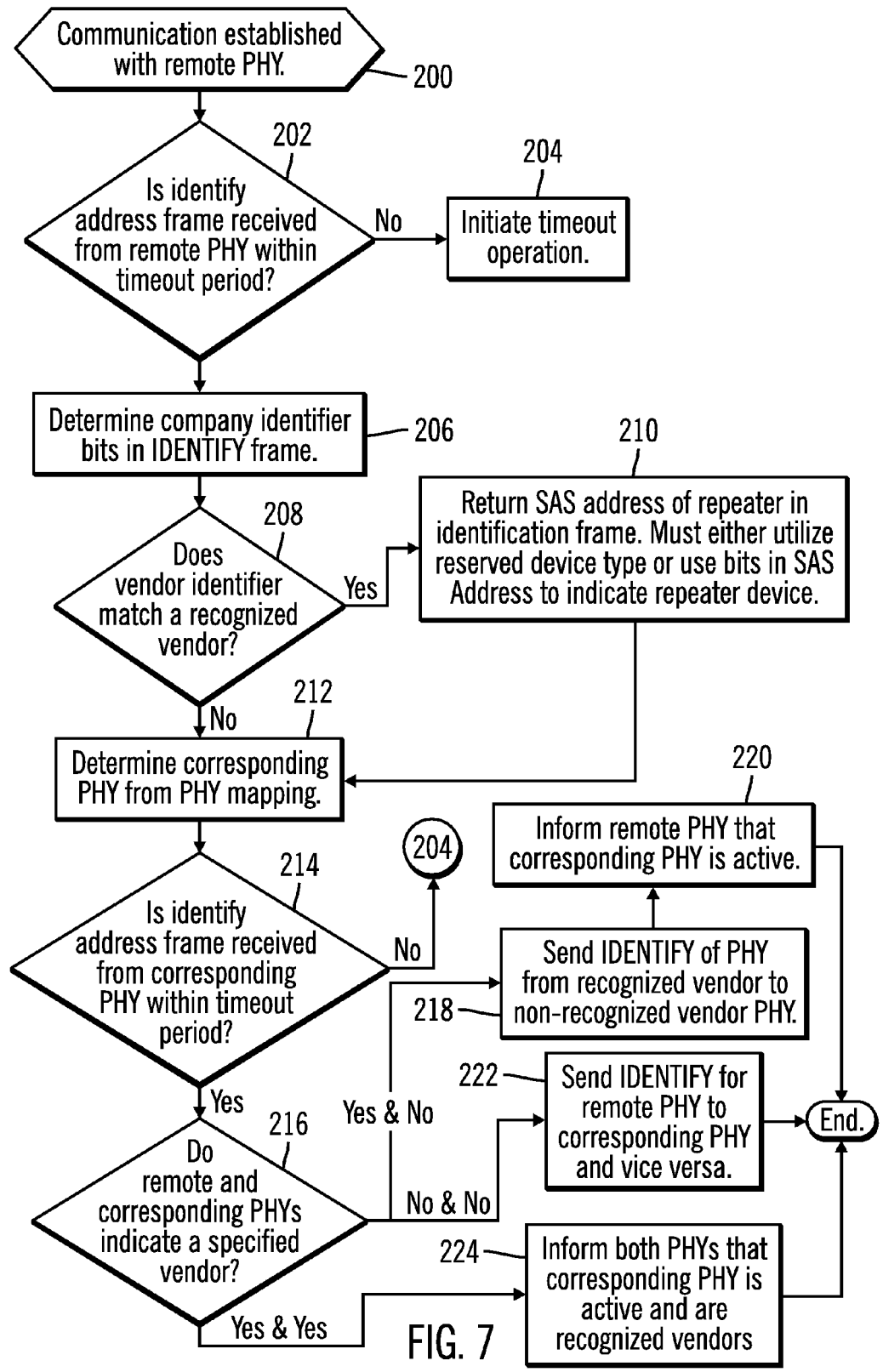
FIGS. 7, 8, 9, and 10 illustrate operations to manage communications between devices in accordance with embodiments.

FIG. 7 illustrates operations performed by the repeater 100 in one embodiment, such as in the repeater PHY layer 120 (FIGS. 3 and 4), during initialization. A PHY layer 120 of the repeater 100 establishes (at block 200) communication with a remote PHY on a connected expander or end device. If (at block 202) an identify address frame is not received from the remote PHY within a timeout period, then a timeout operation is initiated (at block 204), which may comprise shutting down the PHYs, resetting the PHYs, or simply terminating the identification sequence. The PHY layer 120 then determines (at block 206) the company/vendor identifier of the device including the remote PHY. If the determined company identifier, then the PHY layer 120 determines (at block 208) whether the determined vendor identifier matches a recognized vendor identifier. Certain vendor SAS devices may be configured to recognize and communicate with repeaters and be specified, i.e., "known", in the repeater 100. If (at block 208) the vendor of the transmitted identify SAS address is specified or recognized, then the PHY layer 120 returns (at block 210) a SAS address of the repeater 100 in an identification frame. The reserved device type or reserved bits in the SAS Address indicates the vendor information to the repeater 100.

From the no branch of block 208 or block 210, the PHY layer 120 determines (at block 212) the corresponding PHY from the PHY mapping 108. If (at block 214) the identify address frame is not received from the corresponding PHY within a timeout period, then control proceeds to block 204 to initiate a timeout operation. Otherwise, if the identify address frame of the corresponding PHY is received within the timeout period, then a determination is made (at block 216) whether the remote and corresponding PHYs are from a recognized vendor. If (at block 216) one of the remote or corresponding PHYs is from a recognized vendor and the other is not, then the repeater PHY layer 102 sends (at block 218) the identify address of the PHY in a vendor recognized device to the PHY in the non-recognized vendor device and inform (at block 220) that the corresponding PHY is active. At block 218, the identify including the repeater address is sent to the remote PHY if the remote PHY was in a device from a recognized vendor. If (at block 216) both the remote and corresponding PHYs are not in a recognized vendor device, then the PHY layer 102 sends (at block 222) the identify address frame of the recognized PHY to the corresponding PHY, and vice versa. If (at block 224) both the remote and corresponding PHYs are both in a recognized vendor device, then each PHY is informed that the other corresponding object is busy.

With the operations of FIG. 7, the handling of an identify frame from a remote PHY depends on whether the PHY is from a recognized vendor and whether the corresponding PHY to the remote PHY is also in a device from a recognized vendor. When the identify frame is from a device that is not from a recognized vendor, the repeater PHY layer 120 automatically routes the identify address frame to the corresponding connected PHY. A device which is not from a recognized vendor receives the identify address frame from another device connected to the corresponding repeater PHY 104a, 104b, 104c, 104d, 104e, 104f (FIG. 3), not the SAS address of the repeater 100. In this way, the devices connected to the repeater that are not from a recognized vendor do not include the identity of the repeater in their topology because the repeater is functioning only in the first relay mode. Devices that do not receive the SAS address of the repeater may only configure the repeater via the out-of-band port 110 (FIG. 3).

Figure 8:
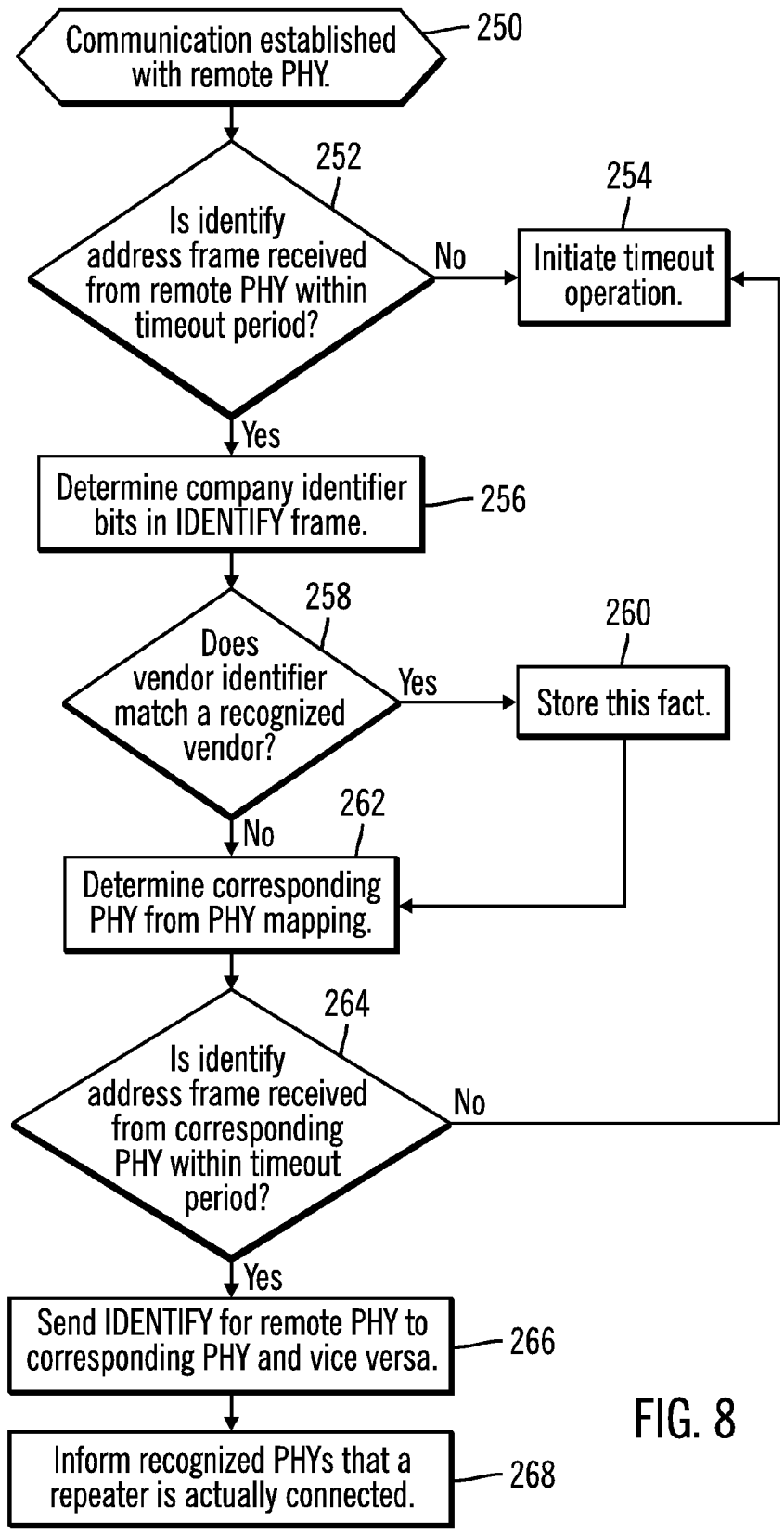

FIG. 8 illustrates an alternative embodiment to FIG. 7 for the repeater to establish communication with a remote PHY. Operations 250, 252, 254, 256, 258 of FIG. 8 are the same as operations 200, 202, 204, 206, and 208 in FIG. 7. In FIG. 8, upon determining (at block 258) that the vendor identifier of the remote PHY is a recognized vendor ID, that information is stored or buffered (at block 260). Further, in FIG. 8, after the identify address frame of the corresponding PHY is received (at block 264), the repeater PHY layer 120 sends (at block 266) the IDENTIFY frame of the remote PHY to the corresponding PHY and vice versa and inform (at block 268) a PHY in a recognized device that a repeater 100 is actually connected through vendor specific requests or primitives following the identification sequence. Informing the PHY at block 268 includes providing the repeater 100 SAS address.

In the embodiment of FIG. 7, if the remote and connected PHYs are in devices from recognized vendors, then the PHYs only receive the repeater SAS address and then subsequently discover each other when issuing discovery requests to the repeater 100. In the embodiment of FIG. 8, the remote and connected PHYs receive the identify message including the address of the other regardless of whether the remote and connected PHYs are in devices from recognized vendors.

Figure 9:
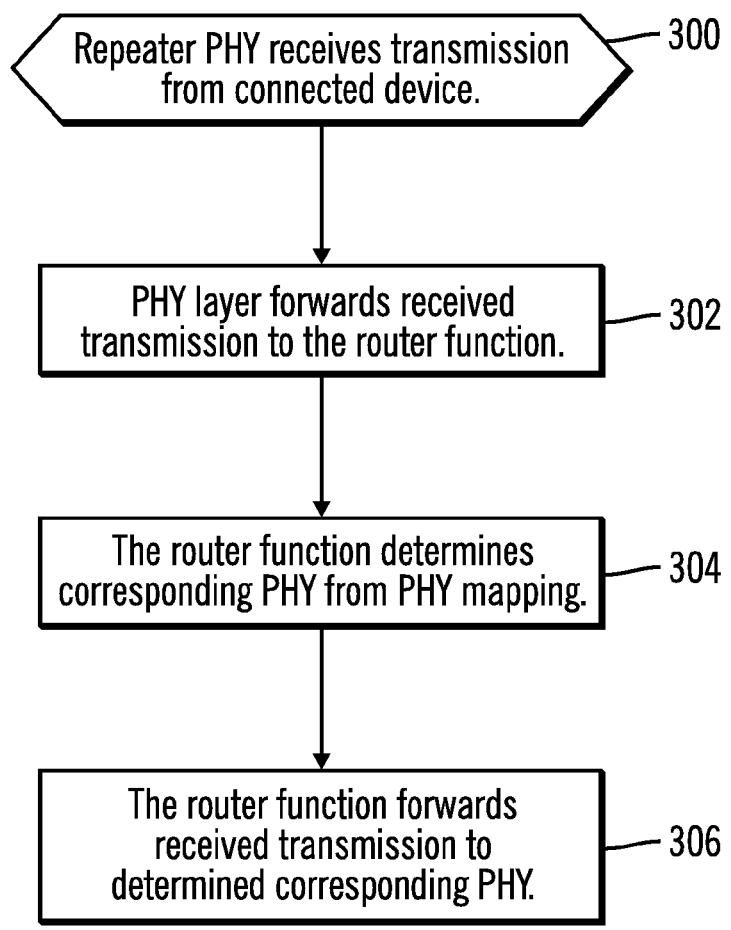

FIG. 9 illustrates operations performed within the repeater 100 upon receiving transmissions after initialization and as part of normal operations. Upon receiving (at block 300) a transmission from a connected device, the PHY layer 120 for the receiving PHY 104a, 104b, 104c, 104d, 104e, 104f forwards (at block 302) the transmission to the expander function 106. The router function determines 106 (at block 304) the corresponding PHY from the PHY mapping 108 and forwards (at block 306) the transmission to the determined corresponding PHY 104a, 104b, 104c, 104d, 104e, 104f. In this way, during normal operations, the repeater 100 passes transmissions through according to a configured PHY mapping 108.

Figure 10:
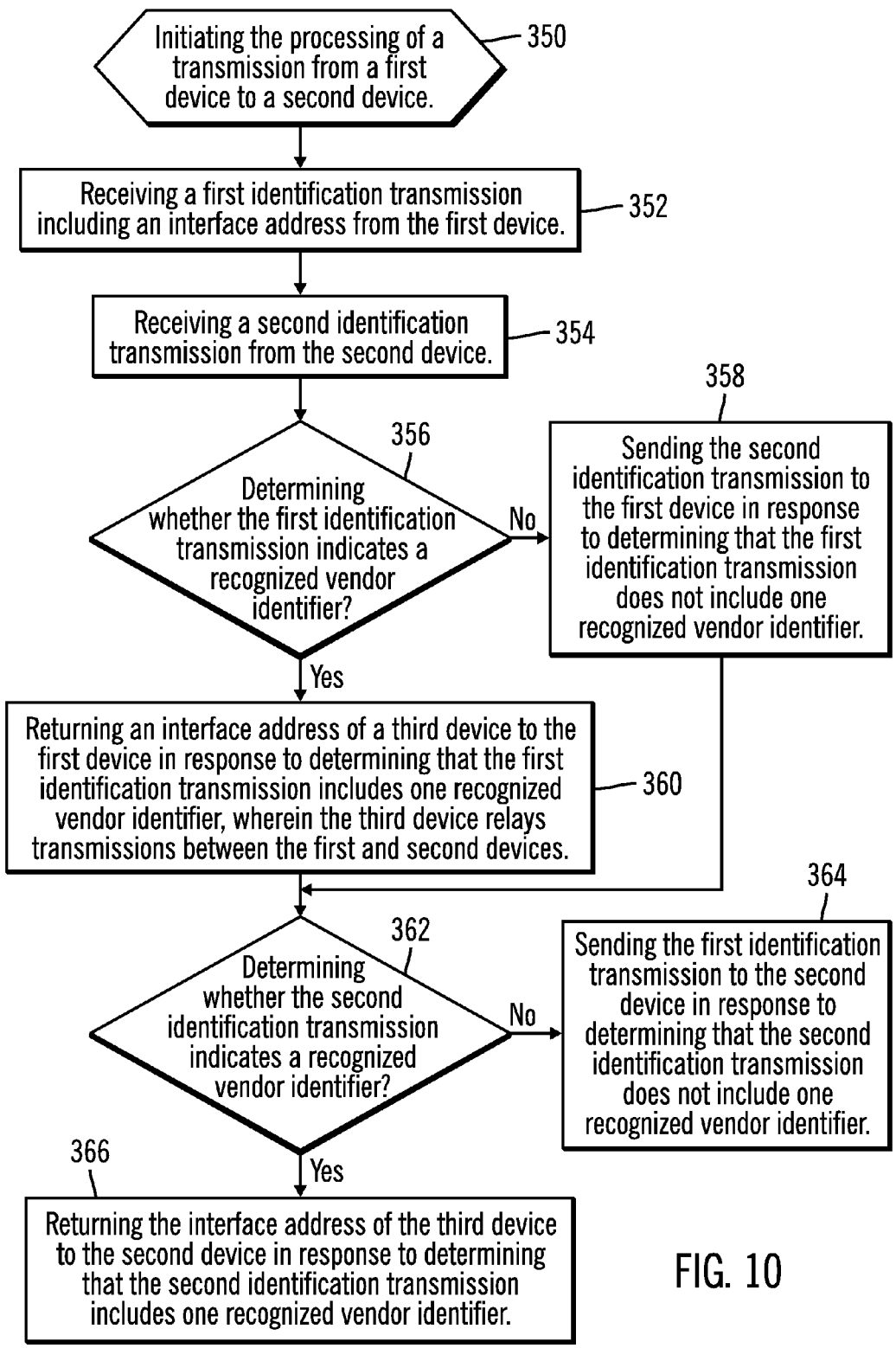

FIG. 10 illustrates a further embodiment. Control begins at block 350 when initiating the processing of a transmission from a first device to a second device. The first device and second device may comprise a network adaptor or a device including an adaptor or other communication circuitry, and the transmission may comprise any transmitted information, such as one or more primitives, frames, packets, etc. A first identification transmission including an interface address from the first device is received (at block 352). An interface address may comprise any address or identifier of a device used to identify the device among other devices. A second identification transmission is received (at block 354) from the second device. A determination is made (at block 356) whether the first identification transmission indicates a recognized vendor identifier, where the vendor comprises an entity that produces, manufactures, assembles or sells the device generating the transmission. The second identification transmission is sent (at block 358) to the first device in response to determining that the first identification transmission does not include one recognized vendor identifier or an interface address of a third device is returned (at block 360) to the first device in response to determining that the first identification transmission includes one recognized vendor identifier, wherein the third device relays transmissions between the first and second devices.

A determination is made (at block 362) as to whether the second identification transmission indicates a recognized vendor identifier. The first identification transmission is sent (at block 364) to the second device in response to determining that the second identification transmission does not include one recognized vendor identifier. The interface address of the third device is returned (at block 366) to the second device in response to determining that the second identification transmission includes one recognized vendor identifier.

The described embodiments provide a repeater or any other type of relay device that may be deployed in any number in a network topology, such as a SAS topology, to extend the distance between devices, such as an initiator and target device, and overcome any limitations on the number of expanders that may be deployed in the network topology. In certain SAS embodiments, those devices connected to the repeater that recognize the repeater, may receive the SAS address from the repeater so that the repeater is recognized in that device's discovery map. Further, the connected device from the recognized vendor includes the capability to specifically configure the repeater, such as change the PHY mapping, the speed of the PHYs, the SAS address of the repeater, and electrical signals to overdrive the signal to increase the distance of the transmission.

ADDITIONAL EMBODIMENT DETAILS

The described embodiments may be implemented as a method, apparatus or article of manufacture using programming and/or engineering techniques to produce software, firmware, hardware, or any combination thereof. The term "article of manufacture" and "circuitry" as used herein refers to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art. Additionally, the devices, adaptors, etc., may be implemented in one or more integrated circuits on the adaptor or on the motherboard.

In the described embodiments, layers were shown as operating within specific components, such as the expander and devices, such as the initiator and target end devices. In alternative implementations, a different arrangement of layers may be programmed to perform the operations described herein.

In certain implementations, the device driver and network adaptor embodiments may be included in a computer system including a storage controller, such as a SCSI, Redundant Array of Independent Disk (RAID), etc., controller, that manages access to a non-volatile storage device, such as a magnetic disk drive, tape media, optical disk, etc. In alternative implementations, the network adaptor embodiments may be included in a system that does not include a storage controller, such as certain hubs and switches.

In described embodiments, the storage interfaces supported by the adaptors comprised SATA and SAS. In additional embodiments, other storage interfaces may be supported. Additionally, the adaptor was described as supporting certain transport protocols, e.g. SSP, STP, and SMP. In further implementations, the adaptor may support additional transport protocols used for transmissions with the supported storage interfaces.

FIGS. 5 and 6 illustrate possible network topologies employing the repeater devices. However, any number of repeaters may be deployed in numerous other network topologies including SAS targets, initiators and expanders.

The illustrated operations of FIGS. 7, 8, and 9 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The adaptor 12 may be implemented on a network card, such as a Peripheral Component Interconnect (PCI) card or some other I/O card, or on integrated circuit components mounted on a system motherboard or backplane.

The foregoing description of various embodiments has been presented for the purposes of illustration and description. It is not intended to be exhaustive or limiting. Many modifications and variations are possible in light of the above teaching.

What is claimed is:

1. A method for processing a transmission from a first device to a second device, comprising:
   receiving an identification transmission including an interface address from the first device;
   determining whether the identification transmission indicates a recognized vendor identifier;
   returning an interface address of a third device to the first device in response to determining that the identification transmission includes one recognized vendor identifier, wherein the third device relays transmissions between the first and second devices and includes a plurality of interfaces;
   maintaining an association of a corresponding interface for each of a plurality of interfaces;
   receiving a transmission from one interface;
   determining from the association the corresponding interface for the interface receiving the transmission; and
   forwarding the transmission to the determined corresponding interface to forward to one device connected to the corresponding interface.

2. The method of claim 1, wherein the identification transmission indicates vendor information in a field in the identification transmission external to the interface address or within bits in the interface address.

3. The method of claim 1, wherein the identification transmission from the first device is received on a first interface, further comprising:
   determining a second interface from a plurality of interfaces corresponding to the first interface, wherein the second device is coupled to the second interface.

4. The method of claim 3, wherein the first and second interfaces comprise PHYs in different ports, and wherein the port addresses are associated with the interfaces included in the ports.

5. A method for processing a transmission from a first device to a second device, comprising:
   receiving a first identification transmission including an interface address from the first device;
   determining whether the first identification transmission indicates a recognized vendor identifier;
   returning an interface address of a third device to the first device in response to determining that the first identification transmission includes one recognized vendor identifier, wherein the third device relays transmissions between the first and second devices;
   receiving a second identification transmission from the second device; and
   sending the first identification transmission to the second device and sending the second identification transmission to the first device in response to receiving the second identification transmission.

6. The method of claim 5, further comprising:
   determining whether the second identification transmission indicates a recognized vendor identifier; and
   returning the interface address of the third device to the second device in response to determining that the second identification transmission includes one recognized vendor identifier.

7. The method of claim 5, wherein the operation of sending the first identification transmission to the second device and sending the second identification transmission to the first device in response to receiving the second identification transmission is only performed if the first and second identification transmissions both do not include one recognized vendor identifier.

8. A method for processing a transmission from a first device to a second device, comprising:
   receiving a first identification transmission including an interface address from the first device;
   determining whether the first identification transmission indicates a recognized vendor identifier;
   returning an interface address of a third device to the first device in response to determining that the first identification transmission includes one recognized vendor identifier, wherein the third device relays transmissions between the first and second devices;
   receiving a second identification transmission from the second device; and
   sending the second identification transmission to the first device in response to determining that the first identification transmission does not include one recognized vendor identifier.

9. The method of claim 8, further comprising:
   determining whether the second identification transmission indicates a recognized vendor identifier; and
   sending the first identification transmission to the second device in response to determining that the second identification transmission does not include one recognized vendor identifier
   returning the interface address of the third device to the second device in response to determining that the second identification transmission includes one recognized vendor identifier.

10. The method of claim 1, wherein the identification transmission from the first device comprises a first identification transmission, further comprising:

determining whether a second identification transmission is received from the second device before a timeout period lapses; and initiating a timeout operation in response to determining that the timeout period has lapsed without receiving the second identification transmission.

11. A method for processing a transmission from a first device to a second device, comprising:

receiving an identification transmission including an interface address from the first device; determining whether the identification transmission indicates a recognized vendor identifier;

returning an interface address of a third device to the first device in response to determining that the identification transmission includes one recognized vendor identifier, wherein the third device relays transmissions between the first and second devices; and receiving a configuration command to configure the third device on an out of band or in-band port, wherein configuration commands on the in-band port are only received from devices originating from one of the recognized vendors.

12. The method of claim 1, wherein the devices comprise SAS devices, and wherein the first and second devices comprise an end device or expander.

13. The method of claim 1, wherein the identification transmission is received during an identification sequence and wherein the interface address of the third device is returned as part of the identification sequence or following the identification sequence.

14. A repeater coupled to a first device and a second device, comprising:

a first interface coupled to the first device;

a second interface coupled to the second device; circuitry capable of causing operations to be performed, the operations comprising:

(i) receiving an identification transmission including an interface address from the first device;

(ii) determining whether the identification transmission indicates a recognized vendor identifier;

(iii) returning an interface address of the repeater to the first device in response to determining that the identification transmission includes one recognized vendor identifier, wherein the repeater relays transmissions between the first and second devices and includes a plurality of interfaces;

(iv) maintaining an association of a corresponding interface for each of a plurality of interfaces;

(v) receiving a transmission from one interface;

(vi) determining from the association the corresponding interface for the interface receiving the transmission; and (vii) forwarding the transmission to the determined corresponding interface to forward to one device connected to the corresponding interface.

15. The repeater of claim 14, wherein the identification transmission indicates vendor information in a field in the identification transmission external to the interface address or within bits in the interface address.

16. The repeater of claim 14, wherein the first and second interfaces comprise PHYs in different ports, and wherein the port addresses are associated with the interfaces included in the ports.

17. A repeater coupled to a first device and a second device, comprising:

a first interface coupled to the first device;

a second interface coupled to the second device;

circuitry capable of causing operations to be performed, the operations comprising:

(i) receiving a first identification transmission including an interface address from the first device;

(ii) determining whether the first identification transmission indicates a recognized vendor identifier;

(iii) returning an interface address of the repeater to the first device in response to determining that the identification transmission includes one recognized vendor identifier, wherein the repeater relays transmissions between the first and second devices;

(iv) receiving a second identification transmission from the second device; and (v) sending the first identification transmission to the second device and sending the second identification transmission to the first device in response to receiving the second identification transmission.

18. The repeater of claim 17, wherein the operations further comprise:

determining whether the second identification transmission indicates a recognized vendor identifier; and returning the interface address of the repeater to the second device in response to determining that the second identification transmission includes one recognized vendor identifier.

19. The repeater of claim 17, wherein the operation of sending the first identification transmission to the second device and sending the second identification transmission to the first device in response to receiving the second identification transmission is only performed if the first and second identification transmissions both do not include one recognized vendor identifier.

20. A repeater coupled to a first device and a second device, comprising:

a first interface coupled to the first device;

a second interface coupled to the second device;

circuitry capable of causing operations to be performed, the operations comprising:

(i) receiving a first identification transmission including an interface address from the first device;

(ii) determining whether the first identification transmission indicates a recognized vendor identifier;

(iii) returning an interface address of the repeater to the first device in response to determining that the identification transmission includes one recognized vendor identifier, wherein the repeater relays transmissions between the first and second devices;

(iv) receiving a second identification transmission from the second device; and (v) sending the second identification transmission to the first device in response to determining that the first identification transmission does not include one recognized vendor identifier.

21. The repeater of claim 20, wherein the operations further comprise:

determining whether the second identification transmission indicates a recognized vendor identifier;

sending the first identification transmission to the second device in response to determining that the second identification transmission does not include one recognized vendor identifier; and returning the interface address of the repeater to the second device in response to determining that the second identification transmission includes one recognized vendor identifier.

22. The repeater of claim 14, wherein the identification transmission from the first device comprises a first identification transmission, wherein the operations further comprise:
 determining whether a second identification transmission is received from the second device before a timeout period lapses; and
 initiating a timeout operation in response to determining that the timeout period has lapsed without receiving the second identification transmission.

23. A repeater coupled to a first device and a second device, comprising:
 a first interface coupled to the first device;
 a second interface coupled to the second device;
 circuitry capable of causing operations to be performed, the operations comprising:
  (i) receiving an identification transmission including an interface address from the first device;
  (ii) determining whether the identification transmission indicates a recognized vendor identifier; and
  (iii) returning an interface address of the repeater to the first device in response to determining that the identification transmission includes one recognized vendor identifier, wherein the repeater relays transmissions between the first and second devices;
  (iv) receiving a configuration command to configure the repeater on an out of band or in-band port, wherein configuration commands on the in-band port are only received from devices originating from one of the recognized vendors.

24. The repeater of claim 14, wherein the identification transmission is received during an identification sequence and wherein the interface address of the repeater is returned as part of the identification sequence or following the identification sequence.

25. An article of manufacture for processing a transmission from a first device to a second device, wherein the article of manufacture causes operations to be performed, the operations comprising:
 receiving an identification transmission including an interface address from the first device;
 determining whether the identification transmission indicates a recognized vendor identifier;
 returning an interface address of a third device to the first device in response to determining that the identification transmission includes one recognized vendor identifier, wherein the third device relays transmissions between the first and second devices and includes a plurality of interfaces;
 maintaining an association of a corresponding interface for each of a plurality of interfaces;
 receiving a transmission from one interface;
 determining from the association the corresponding interface for the interface receiving the transmission; and
 forwarding the transmission to the determined corresponding interface to forward to one device connected to the corresponding interface.

26. The article of manufacture of claim 25, wherein the identification transmission indicates vendor information in a field in the identification transmission external to the interface address or within bits in the interface address.

27. The article of manufacture of claim 25, wherein the identification transmission from the first device is received on a first interface, wherein the operations further comprise:
 determining a second interface from a plurality of interfaces corresponding to the first interface, wherein the second device is coupled to the second interface.

28. The article of manufacture of claim 27, wherein the first and second interfaces comprise PHYs in different ports, and wherein the port addresses are associated with the interfaces included in the ports.

29. An article of manufacture for processing a transmission from a first device to a second device, wherein the article of manufacture causes operations to be performed with respect to a third device, the operations comprising:
 receiving a first identification transmission including an interface address from the first device;
 determining whether the first identification transmission indicates a recognized vendor identifier;
 returning an interface address of the third device to the first device in response to determining that the first identification transmission includes one recognized vendor identifier, wherein the third device relays transmissions between the first and second devices;
 receiving a second identification transmission from the second device; and
 sending the first identification transmission to the second device and sending the second identification transmission to the first device in response to receiving the second identification transmission.

30. The article of manufacture of claim 29, wherein the operations further comprise:
 determining whether the second identification transmission indicates a recognized vendor identifier; and
 returning the interface address of the third device to the second device in response to determining that the second identification transmission includes one recognized vendor identifier.

31. The article of manufacture of claim 29, wherein the operation of sending the first identification transmission to the second device and sending the second identification transmission to the first device in response to receiving the second identification transmission is only performed if the first and second identification transmissions both do not include one recognized vendor identifier.

32. An article of manufacture for processing a transmission from a first device to a second device, wherein the article of manufacture causes operations to be performed with respect to a third device, the operations comprising:
 receiving a first identification transmission including an interface address from the first device;
 determining whether the first identification transmission indicates a recognized vendor identifier;
 returning an interface address of the third device to the first device in response to determining that the first identification transmission includes one recognized vendor identifier, wherein the third device relays transmissions between the first and second devices;
 receiving a second identification transmission from the second device; and
 sending the second identification transmission to the first device in response to determining that the first identification transmission does not include one recognized vendor identifier.

33. The article of manufacture of claim 32, wherein the operations further comprise:
 determining whether the second identification transmission indicates a recognized vendor identifier;
 sending the first identification transmission to the second device in response to determining that the second identification transmission does not include one recognized vendor identifier; and returning the interface address of the third device to the second device in response to determining that the second identification transmission includes one recognized vendor identifier.

34. The article of manufacture of claim 25, wherein the identification transmission from the first device comprises a first identification transmission, wherein the operations further comprise:
   determining whether a second identification transmission is received from the second device before a timeout period lapses; and
   initiating a timeout operation in response to determining that the timeout period has lapsed without receiving the second identification transmission.

35. An article of manufacture for processing a transmission from a first device to a second device, wherein the article of manufacture causes operations to be performed, the operations comprising:
   receiving an identification transmission including an interface address from the first device;
   determining whether the identification transmission indicates a recognized vendor identifier;
   returning an interface address of a third device to the first device in response to determining that the identification transmission includes one recognized vendor identifier, wherein the third device relays transmissions between the first and second devices; and
   receiving a configuration command to configure the third device on an out of band or in-band port, wherein configuration commands on the in-band port are only received from devices originating from one of the recognized vendors.

36. The article of manufacture of claim 25, wherein the article of manufacture stores instructions that when executed result in performance of the operations.

37. A system, comprising:
   a first device;
   a second device; and
   repeater coupled to the first device and a second device, comprising:
      (ii) a first interface coupled to the first device;
      (iii) a second interface coupled to the second device;
      (iii) circuitry capable of causing operations to be performed, the operations comprising:
         (A) receiving a first identification transmission including an interface address from the first device;
         (B) determining whether the first identification transmission indicates a recognized vendor identifier;
         (C) returning an interface address of the repeater to the first device in response to determining that the first identification transmission includes one recognized vendor identifier, wherein the repeater relays transmissions between the first and second devices;
         (D) receiving a second identification transmission from the second device;
         (E) sending the first identification transmission to the second device and sending the second identification transmission to the first device in response to receiving the second identification transmission.

* * * * *